(12) United States Patent
Pillai et al.

(10) Patent No.: US 11,467,951 B2
(45) Date of Patent: Oct. 11, 2022

(54) SYSTEM AND METHOD FOR IMPLEMENTING MAINFRAME CONTINUOUS INTEGRATION CONTINUOUS DEVELOPMENT

(71) Applicant: JPMorgan Chase Bank, N.A., New York, NY (US)

(72) Inventors: Vinish Pillai, Mumbai (IN); Monish Pingle, Mumbai (IN); Ashwin Sudhakar Shetty, Navi-Mumbai (IN); Dharmesh Mohanlal Jain, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/675,637

(22) Filed: Nov. 6, 2019

(65) Prior Publication Data
US 2021/0133091 A1    May 6, 2021

(51) Int. Cl.
| | | |
|---|---|---|
| G06F 11/36 | (2006.01) | |
| G06F 9/50 | (2006.01) | |
| G06F 8/33 | (2018.01) | |
| G06F 8/60 | (2018.01) | |
| G06F 9/38 | (2018.01) | |

(52) U.S. Cl.
CPC .......... *G06F 11/3692* (2013.01); *G06F 8/33* (2013.01); *G06F 8/60* (2013.01); *G06F 9/3826* (2013.01); *G06F 9/5077* (2013.01)

(58) Field of Classification Search
CPC ..... G06F 8/10; G06F 8/20; G06F 8/30; G06F 8/33; G06F 8/60–66; G06F 9/3826; G06F 9/5077; G06F 11/3692; G06F 11/36–3696

USPC ................................. 717/120–135, 168–178
See application file for complete search history.

(56) References Cited

U.S. PATENT DOCUMENTS

| | | | | |
|---|---|---|---|---|
| 8,904,405 | B1 * | 12/2014 | Peeters ................ | G06F 9/5077 718/105 |
| 2004/0255265 | A1 * | 12/2004 | Brown .................. | G06Q 10/06 717/101 |
| 2012/0167057 | A1 * | 6/2012 | Schmich ............. | G06F 11/3644 717/130 |

(Continued)

OTHER PUBLICATIONS

"Bitbucket," Wikipedia, last retrieved from https://en.wikipedia.org/wiki/Bitbucket on Jan. 16, 2021. (Year: 2021).*

(Continued)

*Primary Examiner* — Andrew M. Lyons
(74) *Attorney, Agent, or Firm* — Greenblum & Bernstein, P.L.C.

(57) ABSTRACT

An embodiment of the present invention is directed to a Mainframe CI/CD design solution and pattern that provides a complete end to end process for Mainframe application. This enables faster time to market by performing critical SDLC processes, including build, test, scan and deployment in an automated fashion on a regular basis. An embodiment of the present invention is directed to a CI/CD approach that journeys from receiving requirements to final deployment. For any new application onboarding, teams may implement the CI/CD approach that may be customized per requirements of each LOB/Application.

16 Claims, 6 Drawing Sheets

(56) References Cited

U.S. PATENT DOCUMENTS

| | | | | |
|---|---|---|---|---|
| 2013/0152047 | A1* | 6/2013 | Moorthi | G06F 11/368 |
| | | | | 717/124 |
| 2015/0052501 | A1* | 2/2015 | Shani | G06F 11/3688 |
| | | | | 717/124 |
| 2016/0357529 | A1* | 12/2016 | Tsujimori | G06F 8/452 |
| 2018/0189055 | A1* | 7/2018 | Dasgupta | G06F 11/3692 |
| 2018/0364985 | A1* | 12/2018 | Liu | G06F 8/36 |
| 2019/0079850 | A1* | 3/2019 | Zhang | G06F 8/71 |
| 2019/0294528 | A1* | 9/2019 | Avisror | G06F 8/60 |
| 2019/0317879 | A1* | 10/2019 | Mccormick | G06F 11/3664 |
| 2019/0370010 | A1* | 12/2019 | Iley | G06F 11/3696 |

OTHER PUBLICATIONS

Ibrahim, Suhaimi & Idris, Norbik & Munro, Malcolm & Deraman, Aziz. (2005). Integrating Software Traceability for Change Impact Analysis. Int. Arab J. Inf. Technol.. 2. 301-308. (Year: 2005).*

J. Whitmore and W. Tobin, "Improving Attention to Security in Software Design with Analytics and Cognitive Techniques," 2017 IEEE Cybersecurity Development (SecDev), 2017, pp. 16-21, doi: 10.1109/SecDev.2017.16. (Year: 2017).*

\* cited by examiner

US 11,467,951 B2

SYSTEM AND METHOD FOR IMPLEMENTING MAINFRAME CONTINUOUS INTEGRATION CONTINUOUS DEVELOPMENT

FIELD OF THE INVENTION

The invention relates generally to a system and method for implementing a mainframe Continuous Integration/Continuous Development (CI/CD) process.

BACKGROUND OF THE INVENTION

In many banks and other large entities, mainframe applications currently do not have an automated end-to-end Continuous Integration/Continuous Deployment (CI/CD) process due to complex legacy architectures. This results in a difficult challenge to keep pace with distributed front end systems with mature software development processes (e.g., DevOps). Accordingly, time to market becomes a bigger problem. Because mainframe processes are critical (due to their speed, efficiency and performance), there is a need for DevOps to keep abreast with the transformation journey that the entire banking industry is embarking on for improved customer experiences.

These and other drawbacks exist.

SUMMARY OF THE INVENTION

According to one embodiment, the invention relates to a system that implements mainframe CI/CD. The system comprises: a code repository system; an interface that receives inputs from a user device via a communication network; and a computer processor, coupled to the memory component and the interface, the computer processor executing in a mainframe environment comprising a production logical partition (LPAR) and a development logical partition (LPAR) and further configured to perform the steps of: performing requirement analysis and code development; building a continuous integration continuous development pipeline for the mainframe environment; performing one or more code scans; performing automated testing; automating deploying to the development LPAR; and providing, via a pipeline snapshot interface, pipeline feedback data.

According to another embodiment, the invention relates to a method that implements mainframe CI/CD. The method comprises the steps of: performing requirement analysis and code development in a mainframe environment comprising a production logical partition (LPAR) and a development logical partition (LPAR); building a continuous integration continuous development pipeline for the mainframe environment; performing one or more code scans; performing automated testing; automating deploying to the development LPAR; and providing, via a pipeline snapshot interface, pipeline feedback data.

The system may be implemented as a specially programmed computer system comprising one or more computer processors, interactive interfaces, electronic storage devices, and networks. The computer implemented system and method described herein provide unique advantages to entities, organizations and other users, according to various embodiments of the invention. In the new age of mobility and digital transformation, enterprises need to move faster and more flexibly in application development, testing and quality assurance (QA) to keep up with the competition and meet customer expectations for shorter cycle times and higher service levels. This requires integrating the efforts of their development and QA teams and automating manual processes wherever possible. An embodiment of the present invention is directed to improving employee productivity, adopting new technology, and enhancing customer experience and engagement. A large portion of the Front end Distributed applications rely on Mainframe Legacy applications to get the customer data and various other details where the Mainframe is a System of Record (SOR). These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
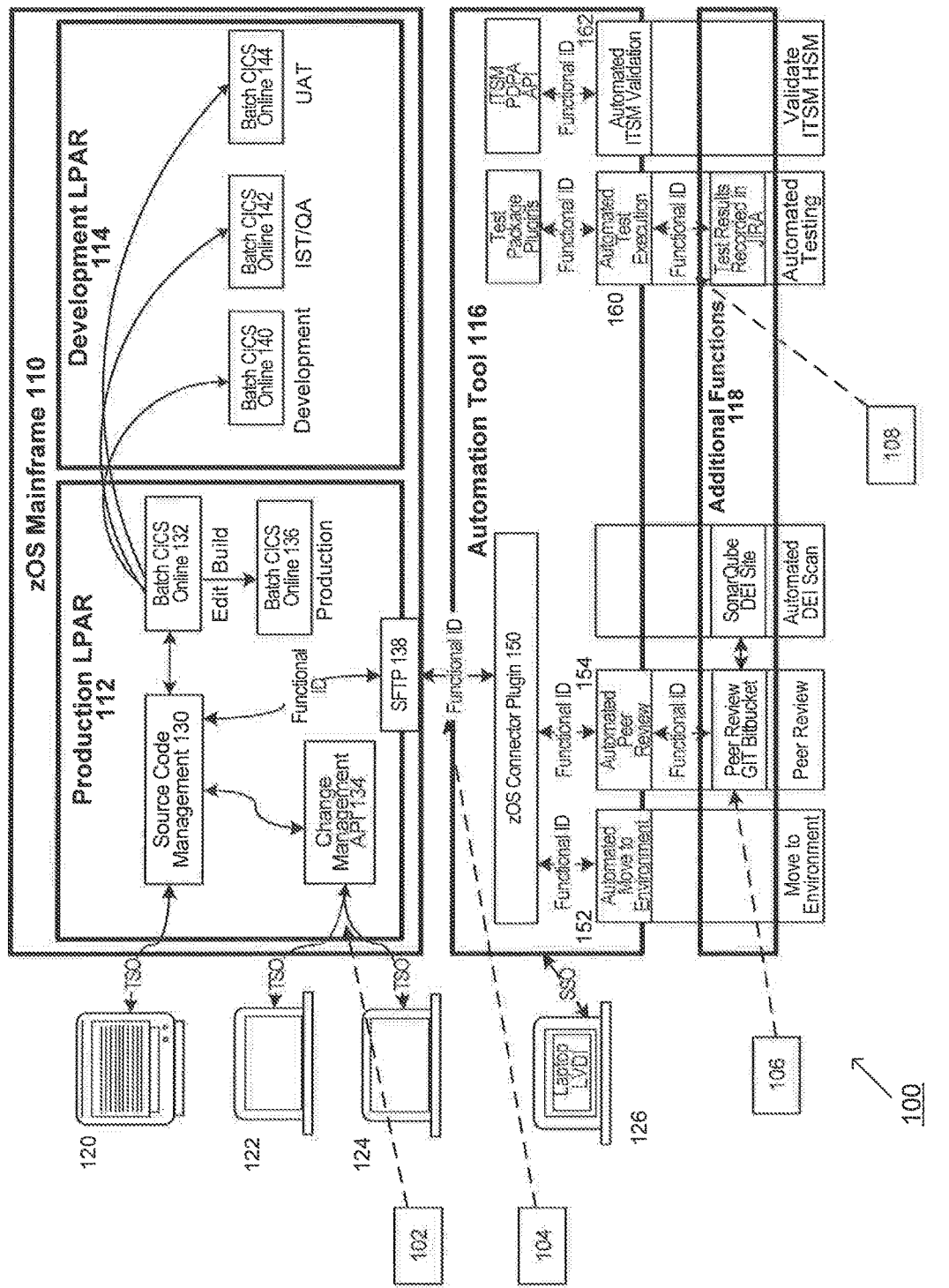
FIG. 1 is an exemplary system illustrating tools connectivity and flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Mainframe CI/CD design solution and pattern that provides a complete end to end process for Mainframe applications. This enables faster time to market by performing critical Software Development Life Cycle (SDLC) processes, including building, testing, scanning and deployment in an automated fashion on a regular basis. An exemplary implementation may leverage an orchestration tool, such as Jenkins orchestration, to automate the various pipeline steps by integrating a set of tools. An exemplary set of tools may include: 1. Integrated Development Environment (IDE)(e.g., Topaz/IDz); 2. Issue Tracking and Project Management system (e.g., JIRA); 3. Code Repository System (e.g., BitBucket); 4. Scanning (e.g., SSAP/FASTDEI); 5. Automated testing using an automated functional testing tool (e.g., LeanFT); 6. Auto-deployment via Changeman/Endevor. Changeman represents a comprehensive, automated change management system for reliably implementing mainframe software changes from development to testing to production. Endevor represents a source code management and release management tool for mainframe computers running z/OS.

Changeman and Endevor are mere examples; other systems and tools may be implemented.

Current Mainframe applications do not have a well-defined Automated End to End Continuous Integration-Continuous Deployment process due to complex legacy architectures, dependencies with cross block, infrastructure dependencies and lack of mature toolsets. Accordingly, keeping pace with the distributed front end systems is difficult as they have a highly matured DevOps process that enable them to deliver fast. It is an even bigger hurdle to deliver fast as mainframe applications plan their release quarterly which does not benefit distributed partners and clients.

To accelerate the end to end delivery and improve time to market, an embodiment of the present invention is directed to building an innovative CI/CD model that integrates a SDLC process to improve the efficiency, reduce the manual effort and provide faster delivery.

An embodiment of the present invention may be applied to various businesses, such as CCB (Consumer & Community Banking), by establishing a C/CD model for Mainframe applications. According to an exemplary embodiment, the Consumer Cards Business may rely primarily on a set of Critical Mainframe Applications that run on a Mainframe Platform. The Core applications may use various Mainframe tools and process a huge volume of data relating to customer credit cards on a daily basis. These Mainframe Applications (which may be divided over 30 agile teams across locations) may support a Core Card business and serve as the System of Record (SOR) for various external applications which may be connected for MQ, TCP/IP connection, ST5 File transfer, etc.

According to an exemplary application, a set of Critical Mainframe Applications may include: Cardholder—Servicing; Tandem/MF Authorization—Authorization Platform; and ACAPS—Origination. These application represent core applications in card services and run on a legacy mainframe platform and process various critical functions including card member account management, transaction approval and decline, etc. Currently, these applications follow a Coordinated Calendar and Monthly Release to deploy their code leveraging the Changeman as their source code management for the Code build, scan/audit and deployment. This may include quarterly production releases to deploy new features.

An embodiment of the present invention is directed to a CI/CD approach that journeys from receiving requirements to final deployment. For any new application onboarding, teams may implement the CI/CD approach customized per requirements of each LOB/Application.

For example, an exemplary DevOps for mainframe (zOS) may involve: Modern IDEs (Integrated Development Environments); Automated Testing at various levels; Automated CI (Continuous Integration) Pipeline; Automated CD (Continuous Delivery) pipeline; SCM (Software Code Management) that supports concurrent development with merge capabilities; Cross platform testing tools with Automation capabilities; Cross platform data gathering, masking and simplification tools; Automation Orchestration Engine and Start and Stop Customer Information Control System (CICS) through automation. CICS may represent middleware designed to support rapid, high volume online transaction processing.

The CI/CD approach of an embodiment of the present invention may include Build Tools (e.g., TOPAZ, IBM-IDz, etc.); Test Tools (e.g., Cucumber, LeanFT, etc.); Review/Scan Tools (e.g., SONAR, Bitbucket, etc.); Deploy Tools (e.g., Changeman, etc.) and Orchestration Tools (e.g., Jenkins, Jules, etc.).

Build Tools may include Integrated Development Environment (IDE) tools, such as Topaz Workbench from Compuware and IBM IDz. Other software applications that provide comprehensive facilities for software development. IDE Tools may streamline mainframe application development with System z software. IDE Tools may include an interface that supports mainframe application development, testing, and maintenance. IDE Tools may also support a seamless integration with various COBOL plug-ins. For example, developers may receive on-the-fly feedback on code quality and adherence to standards as they edit mainframe source code. In addition, IDE Tools may work with automation tools for Continuous Integration. This integration enables organizations to easily publish COBOL code metrics into dashboards for tracking quality metrics and technical debt. Development and QA managers may more easily keep projects on schedule and address shortfalls in quality or technical standards.

Test Tools may support automated testing processes. Functional testing tools may be developed specifically for agile and DevOps software development methods.

Review/Scan Tools may provide peer review processes and code scans. Review/Scan Tools may include web-based version control repository hosting services for source code and development projects.

Deploy Tools may include comprehensive automated change management system for implementing mainframe software changes from development to testing to production. For example, Deploy Tools may include comprehensive fully integrated solutions for Software Change Management systems in z/OS environments. Deploy Tools may further manage and automate an application life cycle, protect integrity of a code migration process, and result in higher quality delivered code to any test and production environment.

Orchestration Tools may include an open source automation server written in Java, for example. Orchestration Tools may automate the non-human part of the software development process, with continuous integration and facilitating technical aspects of continuous delivery. Orchestration Tools may represent a server-based system that runs in servlet containers. Orchestration Tools may provide a central service to build, test, scan and deploy applications and provide Continuous Integration and Delivery (CI/CD).

FIG. 1 is an exemplary system illustrating tools connectivity and flow, according to an embodiment of the present invention. IDE Tools (e.g., TOPAZ/IDz, developer tools, etc.) may connect to a Change Management Tool, as shown by 102. Automation Tool 116 may connect to zOS Mainframe 110 through a Secure Socket Shell (SSH) Key exchange, as shown by 104. Automation Tool 116 may connect to Code Repository System (e.g., Bitbucket) which contains code for Review and Scan as shown by 106. Automated Testing may be initiated using events (e.g., Jenkins-Bitbucket Time triggered/Commit event) as shown by 108. Bitbucket is one example of a Code Repository System that provides version control repository hosting service. Other repositories and management systems may be used. Jenkins represents an exemplary orchestration tool to automate the various pipeline steps by integrating a set of tools. Jenkins is one example; other orchestration tools may be implemented.

As shown in FIG. 1, zOS Mainframe 110 may support Production Logical Partition (LPAR) 112 and Development Logical Partition (LPAR) 114, which communicate with Automation Tool 116 and also provide Additional Functions represented by 118. Production LPAR 112 may support Source Code Management 130 and Batch CISC Online 132. CICS may represent Customer Information Control System Programming language used for an online interface to perform input/output operation on mainframe system. Batch CICS Online may perform edit and build functions via Batch CISC Online 136. User inputs may be received by interfaces 120, 122, 124 that communicate via Time Sharing Option (TSO) with Source Code Management 130. In this example, interfaces 122 and 124 may represent Integrated Development Environment (IDE) tools, such as Topaz and developer tools (e.g., RDz/IDz) that communicate with Change Management API 134. Change Management may represent an automated change management system for reliably implementing mainframe software changes from development to testing to production. Change Management systems may include Changeman, Endevor and other systems and tools may. Functional ID may be communicated between Source Code Management 130 and Secure File Transfer Protocol (SFTP) 138. Automation Tool 116 may represent an automation server for continuous integration, such as Jenkins.

zOS Mainframe may connect with Automation Tool 116 via SFTP. Automation Tool 116 may support zOS Connector Plugin 150, Test Package Plugins 156 and IT Service Management (ITSM) Pre-Authorized Documented Production Activity (PDPA) API 158. User inputs may be received through Laptop LVDI 126 via Single Sign On (SSO). zOS Connector Plugin may communicate Function ID via 152, 154, 160 and 162.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
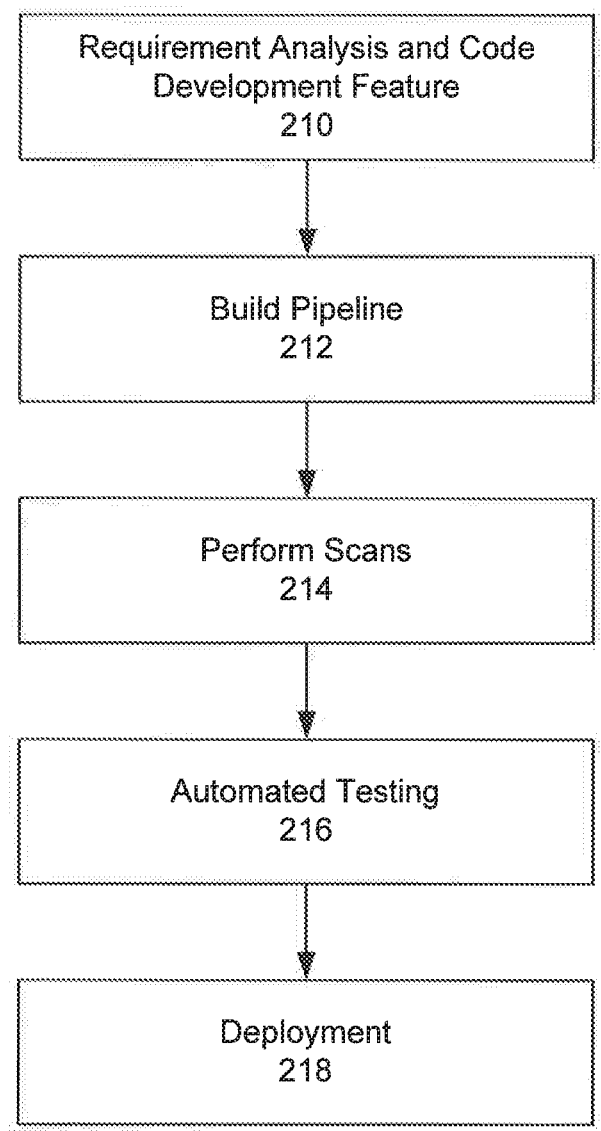
FIG. 2 is an exemplary flow diagram for mainframe CI/CD, according to an embodiment of the present invention.

FIG. 2 is an exemplary flow diagram for mainframe CI/CD, according to an embodiment of the present invention. Step 210 represents a requirement analysis and code development phase. At step 212, build pipeline may be performed. At step 214, an embodiment of the present invention may perform scans. At step 216, automated testing and functional testing may be performed. At step 218, deployment may be initiated. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
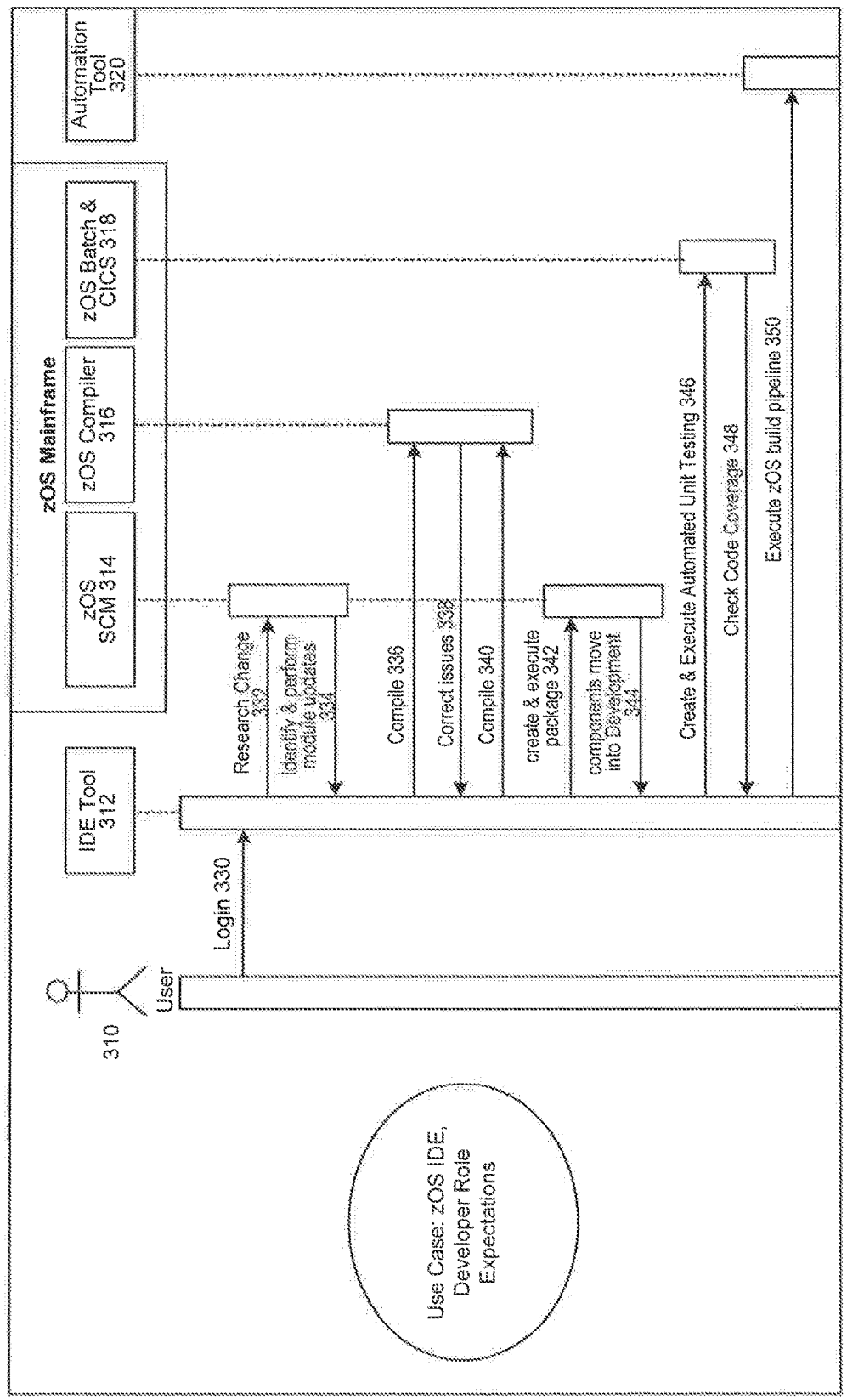
FIG. 3 is an exemplary diagram of a workflow, according to an embodiment of the present invention.

FIG. 3 is an exemplary diagram of a workflow, according to an embodiment of the present invention. FIG. 3 illustrates a first stage of a pipeline as various development activities are performed during this stage. An exemplary workflow is illustrated and describes developer activities to build, compile and/or unit test the requirement and get it ready for the next phase.

As shown in FIG. 3, a first phase involves Requirement Analysis and Code Development Phase. For example, a Developer may work on stories from an issue tracking and product management system, e.g., Jira. Developers may login into IDE Tools (e.g., IDz/Topaz) to analyze the requirements and identify the code changes and overall impacts. According to an exemplary illustration, IDE tools may provide features for Build, Stage and Compile for code changes in a change management system, such as Changeman/Endevor through Serena/Endevor Perspective. An embodiment of the present invention may create packages and perform the changes for the requirements and further deploy the changes into development environment.

IDE tools may provide features such as DB2, IMS and File-Aid plugins for test data preparation and validation and also features for automated unit testing, such as Topaz for Total Test and zUnit. An embodiment of the present invention may perform data preparation and automated unit testing within the tools. Code Coverage and Sonar Scans may be performed within the tool itself. Changes may then be ready to be deployed through the CI/CD pipeline of an embodiment of the present invention.

FIG. 3 supports an exemplary use case involving zOS IDE and Developer Role expectations. FIG. 3 represents interactions between User 310, IDE Tool 312 (e.g., IDz, Topaz, etc.) and zOS Mainframe components zOS SCM 314, zOS Compiler 316 and zOS Batch and CICS 318 along with Automation Tool 320 (e.g., Jenkins, etc.). User 310 may login via IDE Tool 312, as shown by 330. IDE Tool 312 may initiate Research Change via 332. Identity may be confirmed and module updates may be performed via 334. IDE Tool 312 may compile data via zOS Compiler, as shown by 336. Issues may be corrected via 338 and data may be compiled at 340. IDE Tool 312 may create and execute packages at 342. Components may be moved into Development via 344. Automated unit testing may be created and executed via 346. Code coverage may be checked at 348. zOS build pipeline may be executed at Jenkins via 350.

Figure 4:
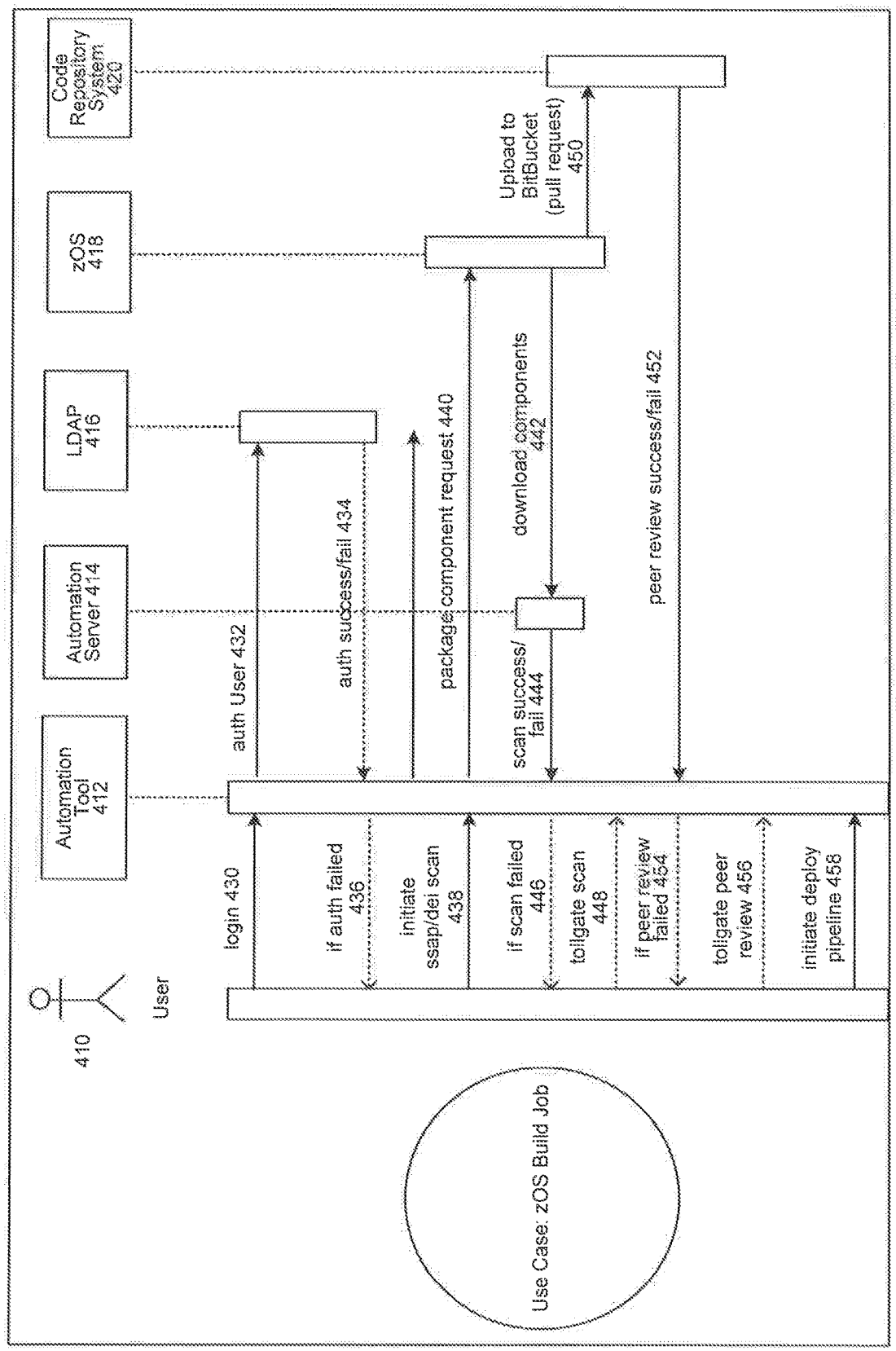
FIG. 4 is an exemplary diagram of a workflow, according to an embodiment of the present invention.

FIG. 4 is an exemplary diagram of a workflow, according to an embodiment of the present invention. As shown in FIG. 4, Phase 2 may involve a Build Pipeline Using Jenkins Phase. After the stage 1, an embodiment of the present invention may proceed to Review and Scan stages. FIG. 4 illustrates the handshake and tools that may be used.

FIG. 4 illustrates a building a pipeline and performing scans, according to an embodiment of the present invention. FIG. 4 represents interactions between User 410, Automation Tool 312 (e.g., Jenkins, etc.), Automation Server 414 (e.g., Jenkins Server, etc.), LDAP 416, zOS 418 and Code Repository System 420 (e.g., Bitbucket, etc.). As shown in FIG. 4, User 410 may login to Automation Server 414 via 430. User authentication 432 and access to specific jobs may be handled by Automation Server 414. Successful authentication is shown at 434 and a failed authentication is shown at 436 where the user may resubmit. A pipeline trigger may be initiated via a user interactive icon or other input. For example, scans may be initiated at 438. The pipeline may promote package components to a Code Repository System 420 configured in a job via 440. The components may be downloaded via 442 and pushed to zOS 418 via 450. For example, Code Repository System 420 may trigger scans, such as various source code scanning tools including SSAP and Fast DEI (SONAR) scans on Jules. These exemplary scanning tools may identify vulnerabilities in the code like syntax error, looping and other issues and provide a score that represents how the code is complying with standards. Once the Scan is complete (as shown by 444), the developers may create a pull request in the Code Repository System 420 which may be assigned to Application SMEs. Scan failure is shown at 446. Tollgate Scan may be initiated at 448. The SMEs may review the changes made in the each component against the baselined version and approve or decline changes with specific review comments at code line level, as shown by 452. Peer review failure is shown at 454. Tollgate peer review is shown at 456. A communication, e.g., an email, may be triggered and sent to the user with the review comments. Once the peer review is completed (at 452), the changes may be promoted to the Integrated Test Environment (QA) to perform further testing. The promotion will be done through the Jenkins job in the pipeline at 458.

Figure 5:
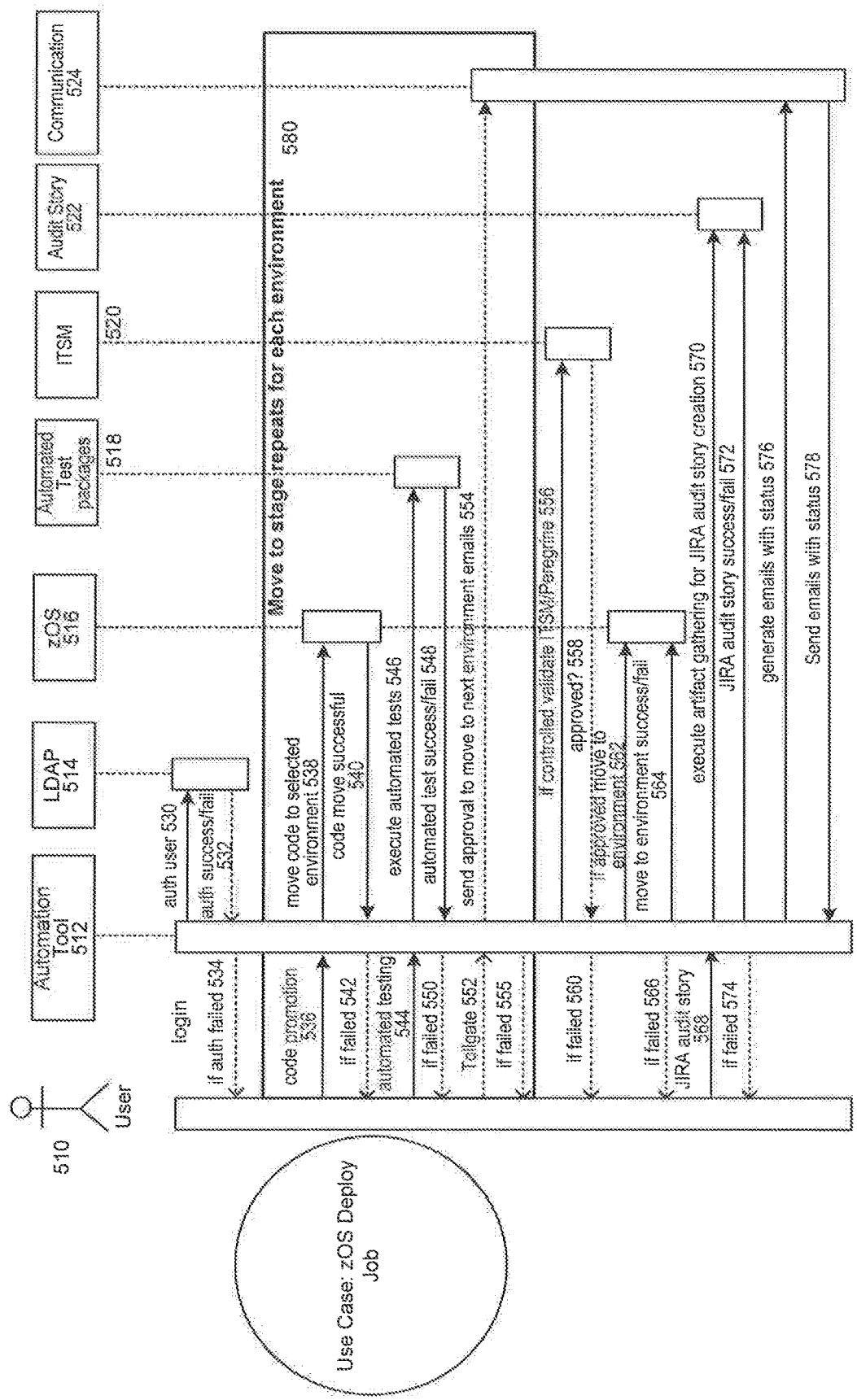
FIG. 5 is an exemplary diagram of a workflow, according to an embodiment of the present invention.

FIG. 5 is an exemplary diagram of a workflow, according to an embodiment of the present invention. Phase 5 may involve Automated Functional Testing using an automated functional testing tool, e.g., LeanFT framework. An embodiment of the present invention may create a feature file with a business requirement in a specific format, such as a Given, When, Then format. An embodiment of the present invention may generate executable or source code to trigger automation test execution steps for a specific statement in the feature file. For each statement (e.g., Given/When/Then), there may be corresponding code to trigger the same. The fields on an interface may be mapped to validate a particular test and input data fields.

Deployment may be made to Controlled Environments (e.g., production or others). Deployment may involve: validating ITSM/PDPA, P1 or P2 is active. For example, ITSM/PDPA may need to be approved, which may involve executing within a time specified. Tollgates for ITSM/PDPA may be represented by P1 or P2 where P1 and P2 refer to incident ticket severity and critical impact to customer. In this example, P1 is the highest and P4 is the lowest. Other variations may be applied. The system may repeat Setup Environment for Controlled Environments, as noted by 580. If production, an embodiment of the present invention may create a JIRA story containing artifacts including Scan, Peer Review, Promotion, testing results and ITSM. The system may then generate and send a communication, such as an email, containing deployment status.

FIG. 5 represents interactions between User 510, Automation Tool 512, LDAP 514, zOS 516, Automated Test Packages 518, IT Service Management (ITSM) 520, Audit Story/Log 522, and Communication 524. As shown in FIG. 5, User 510 may login to Automation Tool 512 where user authentication may be performed at 530. Authentication may succeed or fail at 532 and authentication failure is shown at 534 where the user may resubmit. Code Promotion may be initiated at 536. Code may be moved to a selected environment at 538. Code move success may be represented at 540. 542 represents a failure. Automated Testing may be initiated at 544. Automated tests may be executed at 546. The automated test may succeed or fail at 548. Failure is represented at 550. Tollgate is shown at 552. An approval to move to a next environment may be communicated at 554. Failure is shown at 555. Validation may be represented at 556 and approval is shown at 558. Failure is shown at 560. If approved, a move to the environment may be initiated at 562. Move to environment success or failure may be confirmed at 564. Failure is shown at 566. Audit story/log may be initiated at 568. Artifact gathering for audit story/log creation may be initiated at 570. Audit story/log success of failure may be confirmed at 572. Failure is shown at 574. The system may then generate emails (or other form of communication) with status information at 576. The email (or other communication) may be transmitted at 578.

Figure 6:
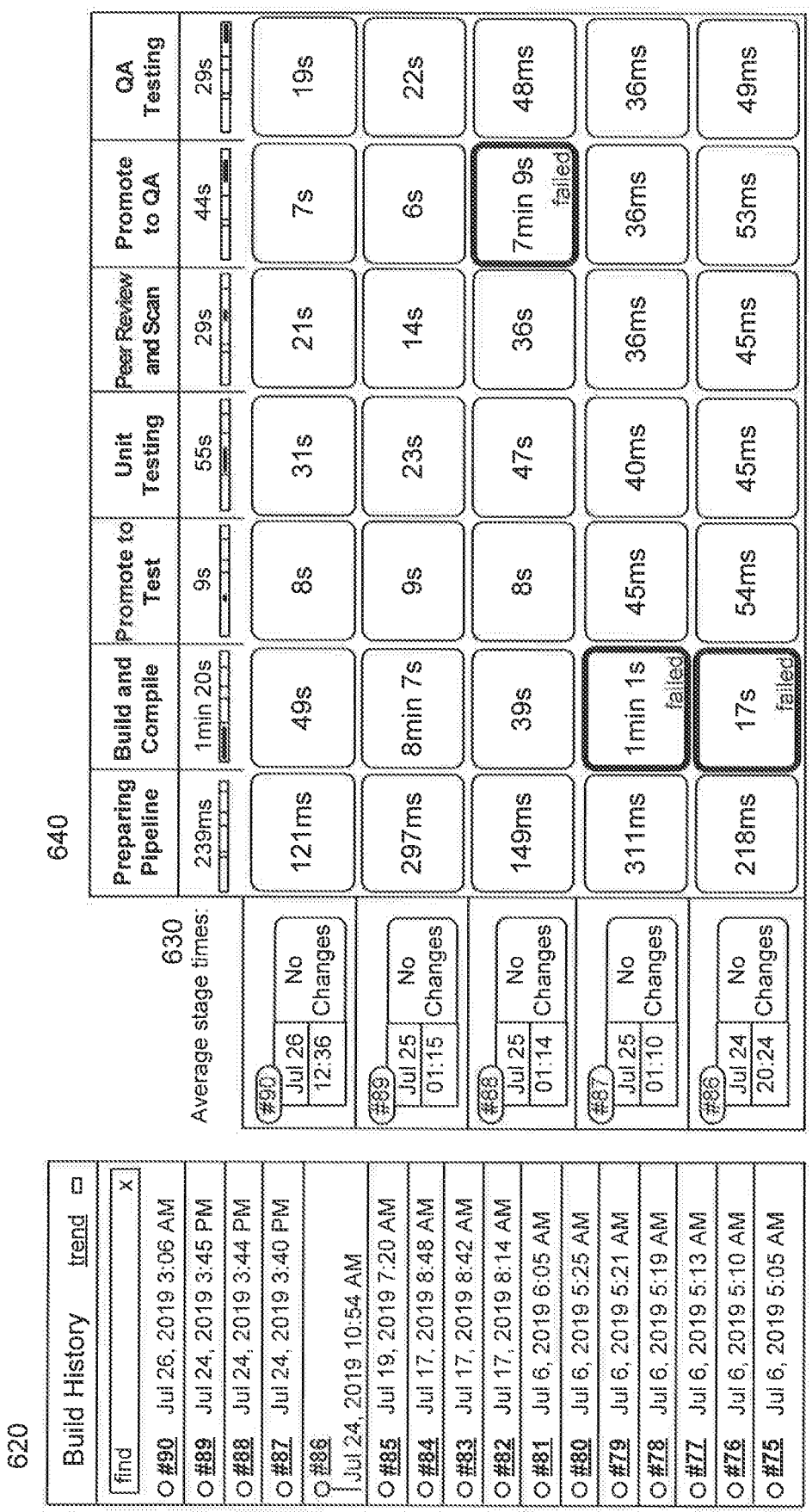
FIG. 6 is an exemplary pipeline snapshot interface, according to an embodiment of the present invention.

FIG. 6 is an exemplary pipeline snapshot interface, according to an embodiment of the present invention. FIG. 6 illustrates a pipeline snapshot interface 610 for mainframe CI/CD. Build History data may be provided at 620. In this example, date and timestamps may be available for each step. Additional details may be provided for various stages of each step. Average stage times are shown at 630 and status information for various stages are shown in detail at 640. As shown in FIG. 6, failures may be identified and highlighted. FIG. 6 provides an exemplary illustration; other variations and varying levels of detail may be provided.

The various embodiments of the present invention may be extended to include additional applications, use cases, functions and features. An embodiment of the present invention may support automation of Test Scripts. An entity may be tasked with migrating existing Unified Functional Testing (UFT) tool which may be based script to Cucumber/LeanFT (Java based) script. For example, a migration task may involve over 1000 automation scripts that need to be converted into the Cucumber based framework. Cucumber may represent a behavior driven development framework. Cucumber and LeanFT are mere examples; other test tools and frameworks may be implemented. An embodiment of the present invention may include automation of test scripts to accomplish an entire conversion.

An embodiment of the present invention may leverage a Jenkins instance on an Operation Technology servers. In addition, an embodiment of the present invention may get a common instance at CCB which may be leveraged by various LOBs. Having a common platform simplifies maintainability and support.

An embodiment of the present invention may support IDE Tools adoption. Mainframe developers may transition to leveraging the IDE tools (TOPAZ/IDz) for the development work. An embodiment of the present invention also supports up skilling where mainframe developers are taking the CORE java and Cucumber LeanFT training to start in sprint Automation, e.g., AFT scripts.

According to an embodiment of the present invention, a CI-CD pipeline design pattern may help legacy mainframe applications to resolve a major hurdle in their DevOps journey. This is a first step in the end to end automation that enable entities to deliver faster and come out of the monolith mindset that Mainframe cannot adopt to a change.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a mainframe continuous integration continuous development, the system comprising:
    a code repository system;
    an interface that receives inputs from a user device via a communication network; and
    a computer processor, coupled to memory component and the interface, the computer processor executing in a mainframe environment, the mainframe environment comprising a production logical partition (LPAR) and a development logical partition (LPAR), the computer processor configured to:
        research, through an integrated development environment (IDE) tool, one or more changes identified by an issue tracking and production management system, the research including analysis of one or more requirements for the identified changes as well as identification of one or more overall impacts caused by the identified changes;
        develop code through integration between the IDE tool and a zOS mainframe, the zOS mainframe comprising a zOS software code management (SCM), a zOS compiler, and a zOS batch and customer information and control (CICS) system, the code development comprising (1) identifying and performing module updates between the IDE tool and the SCM, (2) compiling the code via the zOS compiler, correcting one or more issues via the IDE tool, and re-compiling the code via the zOS compiler, and (3) creating and executing automated unit testing via the zOS batch and CICS system and checking code coverage via the IDE tool;

build a continuous integration continuous development pipeline for the mainframe environment wherein the continuous integration continuous development pipeline promotes the one or more package components to the code repository system;

perform one or more code scans, the one or more code scans being triggered by the code repository system receiving the one or more package components, wherein the one or more code scans identify vulnerabilities in the code comprising syntax error, looping, and compliance with one or more standards, wherein the one or more code scans provide a score representing compliance with the one or more standards, and one or more communication messages are transmitted in response to the one or more code scans identifying the vulnerabilities in the code;

perform automated testing;

automated deployment to the development LPAR; and provide, via a pipeline snapshot interface, pipeline feedback data, wherein the pipeline snapshot interface provides a build history including builds of a build process, identifies each stage of the build process, provides a stage time for each stage of the build process for each of the builds, provides an average stage time for each stage of the build process, and identifies each stage of the build process for each of the builds that failed.

2. The system of claim 1, wherein the interface is part of the IDE tool that supports mainframe application development, testing and maintenance.

3. The system of claim 1, wherein the one or more code scans comprises peer review processes.

4. The system of claim 1, wherein the one or more code scans are performed by a web-based version control repository hosting service for source code and development projects.

5. The system of claim 1, wherein automating deployment is performed by an automated change management system.

6. The system of claim 1, wherein the automated testing is performed by triggering automation test execution steps.

7. The system of claim 1, wherein the pipeline snapshot interface provides build history and a plurality of stages and corresponding status data.

8. The system of claim 1, wherein the mainframe environment comprises the zOS mainframe.

9. A method that implements a mainframe continuous integration continuous development, the method comprising:

researching, through an integrated development environment (IDE) tool and in a mainframe environment comprising a production logical partition (LPAR) and a development logical partition (LPAR), one or more changes identified by an issue tracking and production management system, the research including analysis of one or more requirements for the identified changes as well as identification of one or more overall impacts caused by the identified changes;

developing code in the mainframe environment through integration between the IDE tool and a zOS mainframe, the zOS mainframe comprising a zOS software code management (SCM), a zOS compiler, and a zOS batch and customer information and control (CICS) system, the code development comprising (1) identifying and performing module updates between the IDE tool and the SCM, (2) compiling the code, correcting one or more issues, and re-compiling the code between the IDE tool and the zOS Compiler, and (3) creating and executing automated unit testing and checking code coverage between the IDE tool and the zOS batch and CICS system;

building a continuous integration continuous development pipeline for the mainframe environment wherein the continuous integration continuous development pipeline promotes the one or more package components to the code repository system;

performing one or more code scans, the one or more code scans are triggered by the code repository system receiving the one or more package components, wherein the one or more code scans identify vulnerabilities in the code comprising syntax error, looping, and compliance with one or more standards, wherein the one or more code scans provide a score representing compliance with the one or more standards, and one or more communication messages are transmitted in response to the one or more code scans identifying the vulnerabilities in the code;

performing automated testing;

automating deploying to the development LPAR; and providing, via a pipeline snapshot interface, pipeline feedback data, wherein the pipeline snapshot interface provides a build history including builds of a build process, identifies each stage of the build process, provides a stage time for each stage of the build process for each of the builds, provides an average stage time for each stage of the build process, and identifies each stage of the build process for each of the builds that failed.

10. The method of claim 9, wherein the interface is part of the IDE tool that supports mainframe application development, testing and maintenance.

11. The method of claim 9, wherein the one or more code scans comprises peer review processes.

12. The method of claim 9, wherein the one or more code scans are performed by a web-based version control repository hosting service for source code and development projects.

13. The method of claim 9, wherein automating deployment is performed by an automated change management system.

14. The method of claim 9, wherein the automated testing is performed by triggering automation test execution steps.

15. The method of claim 9, wherein the pipeline feedback may be provided via a pipeline snapshot interface.

16. The method of claim 9, wherein the mainframe environment comprises the zOS mainframe.

* * * * *